United States Patent
Bosquet et al.

(10) Patent No.: US 10,534,991 B2
(45) Date of Patent: Jan. 14, 2020

(54) MICROCIRCUIT CARD CONTAINING MULTIPLE PRE-CUTOUT CARDS HAVING ONE AND THE SAME SPAN OF CONTACTS

(71) Applicant: OBERTHUR TECHNOLOGIES, Colombes (FR)

(72) Inventors: Olivier Bosquet, Colombes (FR); Mouy-Kuong Sron, Colombes (FR)

(73) Assignee: IDEMIA FRANCE, Colombes (FR)

( * ) Notice: Subject to any disclaimer, the term of this patent is extended or adjusted under 35 U.S.C. 154(b) by 379 days.

(21) Appl. No.: 15/037,781

(22) PCT Filed: Nov. 18, 2014

(86) PCT No.: PCT/FR2014/052947
§ 371 (c)(1),
(2) Date: Jun. 7, 2016

(87) PCT Pub. No.: WO2015/075369
PCT Pub. Date: May 28, 2015

(65) Prior Publication Data
US 2016/0292561 A1 Oct. 6, 2016

(30) Foreign Application Priority Data
Nov. 19, 2013 (FR) ..................................... 13 61373

(51) Int. Cl.
*G06F 19/00* (2018.01)
*G06Q 30/00* (2012.01)
(Continued)

(52) U.S. Cl.
CPC ....... *G06K 19/07739* (2013.01); *G06K 19/04* (2013.01)

(58) Field of Classification Search
CPC .. G06K 19/072; G06K 19/077; G06K 7/0021; G06K 7/0069; G06K 19/07743;
(Continued)

(56) References Cited

U.S. PATENT DOCUMENTS

| 2013/0116010 A1* | 5/2013 | Lepp | G06K 19/072 455/558 |
| 2014/0315399 A1* | 10/2014 | Bosquet | G06K 19/07739 439/76.1 |

(Continued)

FOREIGN PATENT DOCUMENTS

| DE | 10 2011 107 203 A1 | 1/2013 |
| DE | 10 2012 001 776 A1 | 8/2013 |

(Continued)

OTHER PUBLICATIONS

International Search Report, dated Jan. 29, 2015, from corresponding PCT Application.

*Primary Examiner* — Thien T Mai
(74) *Attorney, Agent, or Firm* — Young & Thompson

(57) ABSTRACT

A microcircuit card including an overall span of contacts including at least individual contact surfaces connected to this microcircuit while defining two parallel columns situated in proximity to two edges of the overall span, in a card body having a format at least equal to the 2FF format, in which there is made a pre-cutout in the 4FF format surrounding the overall span of contacts and a pre-cutout in the 3FF format surrounding the pre-cutout in the 4FF format, these pre-cutouts being such that the individual contact surfaces have, with respect to each of the pre-cutouts, positions and dimensions such that they encompass the theoretical contact zones defined by the standards defining these 4FF, 3FF and 2FF formats, the upper edge of the pre-cutout in the 3FF format being situated at a distance at (Continued)

least equal to 400 micrometers from the upper edge of the pre-cutout in the 4FF format.

13 Claims, 2 Drawing Sheets

(51) Int. Cl.
*G06K 19/077* (2006.01)
*G06K 19/04* (2006.01)
(58) Field of Classification Search
CPC ....... G06K 19/07739; G06K 19/07741; G06K 7/0043; G06K 7/0034; G06K 7/0052; G06K 19/07732; G06K 7/0073; G06K 13/08; G06K 13/0812; G06K 19/07745; G06K 7/00; G06K 13/0887; G06K 19/07; G06K 19/07345; G06K 19/07716; G06K 7/0013; G06K 7/04; G06K 13/085; G06K 13/0862; G06K 15/04; G06K 19/02; G06K 19/0772; G06K 19/07722; G06K 7/0004; G06K 7/0026; G06K 7/0039; G06K 7/0078; G06K 7/087
See application file for complete search history.

(56) References Cited

U.S. PATENT DOCUMENTS

2015/0001306 A1\* 1/2015 Ottobon ................... G06K 1/02
235/492
2016/0292561 A1\* 10/2016 Bosquet ........... G06K 19/07739

FOREIGN PATENT DOCUMENTS

| EP | 2 608 116 A1 | 6/2013 |
| FR | 2 982 690 A1 | 5/2013 |
| FR | 2 985 061 A1 | 6/2013 |
| WO | 2013/072616 A1 | 5/2013 |

\* cited by examiner

US 10,534,991 B2

MICROCIRCUIT CARD CONTAINING MULTIPLE PRE-CUTOUT CARDS HAVING ONE AND THE SAME SPAN OF CONTACTS

BACKGROUND OF THE INVENTION

Field of the Invention

The invention relates to a microcircuit card containing multiple pre-cut cards containing a same global contact area.

Description of the Related Art

Various microcircuit card formats are known that have contact areas, some of which are defined in the standards ETSI 102 221 (including the latest version, V11.0.0 dated 2012 June) and ISO7816. Thus, there are four known formats, known by the designations 1FF to 4FF:

the 1FF format, also called ID-1, corresponds to the format of credit cards and to a body delimited by a rectangular form of 85.6 mm×54 mm×0.76 mm, the 2FF format, also called ID-000, the card body of which is delimited by a rectangular form of 15 mm×25 mm×0.76 mm, with a 3×3 mm foolproof feature in a corner of the card body, and the 3FF format, also called Mini UICC, the card body of which is delimited by a rectangular form of 15 mm×12 mm×0.76 mm, with a 2.5×2.5 mm foolproof feature in a corner of the card body, and the 4FF format, recently defined, the card body of which is delimited by a rectangular form of 12.3 mm×8.8 mm×0.67 mm with a 1.65 mm×1.65 mm foolproof feature.

These cards have in common the fact that they comprise a microcircuit and individual contact areas or surfaces connected to the microcircuit; the contact surfaces are usually arranged so as to jointly form a global contact area, the outline of which is usually of simple geometrical form, often globally rectangular; conventionally, the microcircuit and the global contact area are borne by a wafer, on the respective faces thereof with which they form a module mounted in a cavity in the body that each card includes.

These contact areas are intended to allow the card concerned to communicate with a communication device by contact. In the case of the 1FF, 2FF or 3FF cards, this contact plate is generally provided with eight contact surfaces commonly designated by the references C1 to C8 usually distributed over two substantially parallel columns. A first column can comprise contacts called C1 to C4 and a second column can comprise the contacts called C5 to C8. The standard ISO7816-2 notably defines the minimum zones of these contact surfaces, namely 2 millimeters wide and 1.7 millimeters high. This standard also defines the relative positions of these contact zones and their dimensions.

Thus, the contact surfaces correspond to actual surfaces whereas the contact zones correspond to the minimum theoretical locations described by the standard ISO7816.

For information, the contact surfaces C1 and C5 are used for the power supply or C1, corresponds to Vcc, also called "positive power supply" and C5 corresponds to GND, also called "earth".

The contact surface C2, also called RST, serves as chip reset.

The contact surface C3, also called CLK, serves as clock for the chip.

The contact surface C7, also called I/O, serves as inputs and outputs for chip information.

The contact surfaces C4, C6 and C8 are intended to be so-called "spare" contacts, which have no particular functions. These days, these contacts C4 and C8 can be used for the USB ports and the contact C6 can be used for the SWP (Single Wire Protocol) communication protocol.

Hereinafter in the description, it can be considered that the contacts that have an index between 1 and 8 have the same functions as those described above.

With regard to the most recent format, 4FF, which is also the smallest, provision is made for the contact surfaces C4 and C8 to be situated between the columns combining the contacts C1 to C3 (on the left) and the contacts C5 to C7 (on the right).

For the rest of the description, it will be considered that a microcircuit card, substantially rectangular with the front face (facing the observer) supporting the contact plate, has the foolproof feature at bottom right of this card. By extension, the face opposite the front face is the rear face.

Concerning the card of 4FF format, it can thus be stated that the contacts C1 and C5 are situated in proximity to the top (or upper) edge of the card or of the contact plate, that the contacts C3 and C7 are situated in proximity to the bottom (or lower) edge, that the contacts C1 to C3 are situated in proximity to the left edge and that the contacts C5 to C7 are situated in proximity to the right edge, that the contact C4 is situated in proximity to the top edge between the two columns and that the contact C8 is situated in proximity to the bottom edge between the two columns.

It should be noted that, although the standards specify the locations and dimensions of the contact zones C4 and C8, a card may not include any specific contact surface C4 or C8, if no function is used in relation to these contacts. In particular, there are cards of 4FF format, even of larger format, that comprise only six distinct contact surfaces, respectively intended to be in contact with contacts C1 to C3, C5 to C7 of an external communication device in read or write mode.

The tolerances of all the cards described above are of the order of 0.1 mm.

The variety of possible uses for a microcircuit card has led to the desire to be able to read a microcircuit in contact-based exchange devices suitable for receiving bodies of various formats; moreover, it has emerged as efficient, from the production point of view, to fabricate microcircuit cards having a given format, and by precutting therein smaller card bodies; in particular, it is still conventional practice to fabricate microcircuit cards in the 1FF format by pre-cutting therein a card body of 2FF format. More recently, it has also been proposed to pre-cut, in a card of 1FF format, a card body in the 2FF format by pre-cutting therein a body of 3FF format; these pre-cuts are made in such a way that the microcircuit mounted in the card of maximum format, in practice 1FF, observes the conditions concerning the placements of the contact surfaces associated with the 2FF format when the body of 2FF format is detached from the original card, even with the 3FF format when the body of 3FF format is detached.

To simplify the detachment of the desired body in a card produced in the 1FF format, the document FR-2 967 515 has proposed various additional cuts that mean that the detachment of the card body in the 3FF format is done by destroying the body in the 2FF format.

With the widening use of the 4FF format, it is now advantageous to be able to fabricate cards in which various card bodies are precut, including the body in the 4FF format, with a microcircuit that observes the dimensioning and placement conditions stipulated by the standards concerning this 4FF format.

However, there are applications in which it is desirable to be able to use a card body in the 4FF format in a contact-based communication device capable of receiving a card in the 4FF format and in another contact-based communication device intended to receive cards with a larger format; to satisfy such a need, adapters have been proposed suitable for receiving a card having a small format by having a larger format relative to which the contact surfaces of this card are positioned so as to observe the constraints of the standards relating to the contact surfaces of a card in the format of the adapter.

However, a difficulty is encountered with the cards of 4FF format whose width (measured parallel to the contact surface alignments, according to the convention mentioned above) is 8.8 mm, whereas the 3FF format defines a width of 12 mm; if the contact zones provided by the standards applicable to the 4FF format are superimposed with those provided by the standards that apply to the 3FF format, it is found that the 3FF format overruns by scarcely 330 micrometers along the top edge of these formats (but by 2.87 mm along the bottom edge); that means that the adapter that makes it possible to convert a card in the 4FF format to the 3FF format is formed by a frame (having, or not having, a bottom), the top side of which has a width of scarcely 330 micrometers, which amounts to stating that this adapter exhibits high risks of breaking this top side in its use.

To mitigate this drawback, there has been proposed, in the document FR-2 982 690 (or the document WO-2013/072616), an adapter in the 3FF format suitable for receiving a card of smaller format, for example in the 4FF format, this small card having contact surfaces which are modified so as to allow the adapter to have a top side that has sufficient width to give it a mechanical strength compatible with its use as adapter.

This modification of the contact surfaces consists in practice in offsetting the contact surfaces of the card in the 4FF format toward its top edge. This offset is identical for all the surfaces C1 to C7 and leads to a reduction of the contact surface C1 (or C5) and an increase in the contact surface C3 (or C7), by reducing the distance between the top edge of the contact zone provided by the standards and the top edge of the card body in the 4FF format, which then makes it possible to increase the width of the top side of the adapter in the 3FF format.

Such a modification therefore amounts to abandoning the usual design rules for the contact plates of microcircuit cards. More specifically, the contact surfaces are arranged in such a way as to encompass the theoretical contact zones provided by the standards to guarantee that a good contact is established with the bump contacts of a contact-based communication device intended to receive a card equipped with such contact surfaces; to optimize such a contact, each contact surface is defined with the greatest possible surface area to guarantee a good contact with the bump contacts of such a communication device despite the fabrication tolerances; that is reflected by the fact that the outlines of the individual contact surfaces are defined relative to one another in such a way as to be separated only by limited spaces with the result that, in appearance, the global contact areas occupy practically all the surface situated within the outline of the global contact area; the almost continuous appearance of the global contact area leads to this area being likened in practice to a plate and to the notion of contact plate. In other words, the individual contact surfaces are in practice globally centered on the theoretical contact zones provided by the standards by exceeding the latter as much as possible while being effectively electrically insulated from one another.

Now, the standards set, for the theoretical contact zones of the various formats of microcircuit cards with contact areas, a regular distribution, which leads to the choice, for the contact surfaces, of a distribution that is also regular, with, in practice, a symmetry relative to a median line extending lengthwise in the body of the card concerned; in the case of a card of 4FF format, it is thus sought to arrange the contact surfaces C1 and C3 (respectively C5 and C7) symmetrically relative to a median line of the body passing through the middle of the contact surface C2 (respectively C6). Similarly, it is usually sought to arrange the surfaces C1 to C3 in a column which is substantially symmetrical to the column formed by the surfaces C5 to C7 (it being stipulated that, in practice, when no specific surface of C4 or C8 type is provided, it is usual practice for the contact surface C5 to be prolonged toward the column C1-C3 then downward so as to occupy the space situated between these columns; this in practice results in a mechanical strengthening because of the presence of the conductive material forming the contact surfaces while conferring a certain esthetic on the contact area formed by the set of contact surfaces. Moreover, it will be understood that the mechanical strength of a card having a small format such as the 4FF format is all the better when the module that it contains is arranged centrally relative to its outline, which amounts to stating that it is desirable for the contact area to be centered relative to the outline of the card body, at least in the direction of its smaller dimension (that is to say its width, measured vertically according to the convention defined above).

The object of the invention is to simultaneously satisfy the two objectives mentioned above, namely to make it possible to fabricate a card comprising a microcircuit surrounded by at least one pre-cut in the 4FF format and one pre-cut in the 3FF format, while making it possible for the material situated between these pre-cuts to constitute an adapter making it possible, without inadvertently breaking, to convert the card in the 4FF format to the 3FF format while retaining as far as possible the design rules for the contact surfaces.

It will be understood that such a problem arises when there is a card whose format is at least equal to the 2FF format, but that the invention has a quite particular benefit when the format of the card is 1FF, in which it is possible to effectively produce a very large number of cards.

BRIEF SUMMARY OF THE INVENTION

To this end, the invention proposes a microcircuit card comprising at least individual contact surfaces C1 to C3, C5 to C7 connected to this microcircuit by defining two parallel columns situated in proximity to two edges of this area, in a card body having a format at least equal to the 2FF format, in which there is formed a pre-cut in the 4FF format surrounding the global contact area and a pre-cut in the 3FF format surrounding the pre-cut in the 4FF format, these pre-cuts being such that the individual contact surfaces C1 to C3, C5 to C7 have, relative to each of the pre-cuts, positions and dimensions such that they encompass the theoretical contact zones defined by the standards defining these 4FF, 3FF and 2FF formats, the top edge of the pre-cut in the 3FF format, defined by the longitudinal edge of the pre-cut furthest away from the corner of this pre-cut comprising a foolproof feature-forming sloping edge, being situated at a distance at least equal to 400 micrometers from the top edge of the pre-cut in the 4FF format, the individual surfaces C1 and C5 being, within these columns, symmetrical to the individual surfaces C3 and C7 relative to a median line of the global contact area extending parallel to the length of this global contact area.

It will be understood that the abovementioned symmetry condition does not prevent one or the other of the individual surfaces from being prolonged, if necessary, to occupy an intermediate space between said columns.

In fact, it has been able to be observed, contrary to what could have been inferred from the document FR-2 982 690, that it was possible to form a global contact area observing the usual rules of symmetry while encompassing both the contact zones provided by the standards for the 4FF format but also those provided for the 3FF format, even when the outline of this 3FF format is offset by a few tens of micrometers relative to the top edge of the outline of the 4FF format. In fact, even by adding the various fabrication tolerances involved in the fabrication of a card of a format at least equal to the 2FF format and comprising cut-outs in the 3FF format and in the 4FF format around the contact area, the contact surfaces are sufficiently extended, transversely to the greater dimension of the global contact area, for it to be possible to be certain of continuing to encompass the theoretical contact zones of the 3FF format when the latter is offset significantly relative to its position recommended (but not imposed) by the standards, relative to the 4FF format.

This card can be in the 2FF format, or be in a larger format; however, preferably, this card is in the 2FF format and is formed within a larger card, advantageously in the 1FF format. Thus, advantageously, the card body in the 2FF format is delimited, by a discontinuous slot, within a card in the 1FF format, the theoretical zones of which are merged with those of the card in the 2FF format.

Advantageously, the global contact area is formed by contact surfaces separated by interstices centered on the interstices between the theoretical contact zones of the card in the 4FF format, which contributes to a good electrical insulation between the contact surfaces, including when they are in contact with the bump contacts of a contact-based communication device; however, the invention suits the case where there is an offset between these real and theoretical interstices.

Advantageously, in the abovementioned case, the theoretical contact zones of the pre-cut in the 3FF format are offset toward the top edge of the card, relative to the theoretical contact zones of the pre-cut in the 4FF format, by a value less than or equal to $(E-e)/2-T$, if E is the width of the interstices between the theoretical contact zones, e is the width of the interstices between the individual contact surfaces and T is a fabrication tolerance value.

Advantageously, the distance between the top edge of the pre-cut in the 3FF format and the top edge of the pre-cut in the 4FF format is at least equal to 490 micrometers. Also advantageously, this distance is at most equal to 550 micrometers or even 545 micrometers, even, particularly preferably, to 542 micrometers (tested value).

Advantageously, the contact area is, as currently, centered relative to the card in the 4FF format, that is to say that, advantageously, the contact area has a standardized format delimited by a rectangular form whose dimensions are equal to 11*8.32 mm. It is advantageous to use this format, called M3, because that makes it possible to not modify a large number of tools for fabricating the modules, machining, or insetting set for said M3 format.

BRIEF DESCRIPTION OF THE DRAWINGS

Objects, features and advantages of the invention will emerge from the following description given in a nonlimiting illustrative manner, in light of the attached drawings in which.

DETAILED DESCRIPTION OF THE PREFERRED EMBODIMENTS

Figure 1:
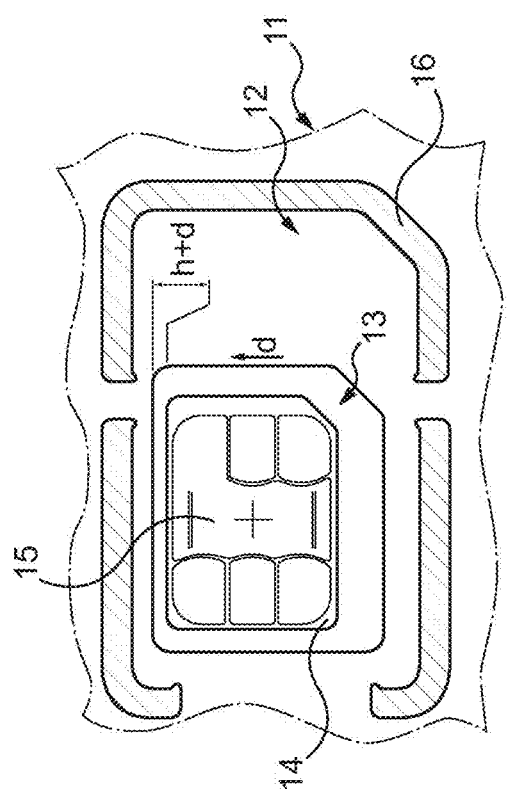
FIG. 1 is a plan view of a card in the 2FF format, within a larger card, surrounding a cut in the 3FF format surrounding a cut in the 4FF format, such that the theoretical contact zones are superimposed.

FIG. 1 represents a card 2, formed here within a card body of larger format and surrounded by a slot 6, in which is formed a cut delimiting a card 3, within which a cut delimits a card 4; this card 4 bears a contact area 5 formed by a number of contact surfaces.

The slot 6 surrounding the card is, as is known per se, interrupted along the small side on the left (the material is, along this small side, incompletely cut) and in a zone situated on the top side of the card 2. This slot therefore defines an incomplete cut.

Similarly, the cut defining the outline of the card 3 can be complete or not; it can thus be a complete cut performed with a tool that is sufficiently thin for the card 3 to remain within the card 2 by friction between its edge and the inner edge of the cut concerned; as a variant, there may remain, in certain places, a continuity of material between the card 3 and the frame which completes this card 3 to form the card 2.

The same comments can be made with regard to the cut delimiting the card 4 within the card 3.

By convention, the notions of cut and of pre-cut both denote, here, a significant reduction of mechanical link through this cut or pre-cut suitable for making a subsequent detachment along the outline concerned easy, while ensuring until then a sufficient link to keep each card in place within the card of larger format.

In fact, this card 4 is in the 4FF format defined by the standards ISO7816-2 and ETSI 102 221 V11.0.0; the global contact area 5 comprises individual contact surfaces which are centered on theoretical contact zones which are defined in these standards (that will be detailed with respect to FIG. 4), in position and in dimension relative to the top edge of this card. Regarding the card 3, it is in the 3FF format as defined by the abovementioned standards, which similarly define theoretical contact zones in position and in dimension relative to the top edge of this card 3.

Finally, the card 2 is in the 2FF format as defined by the abovementioned standards, which define theoretical contact zones in position and in dimension relative to the top edge of this card 2.

It should be noted that these standards indicate the positioning that each of the cards can have for the theoretical contact zones defined for a given format to be superimposed on the theoretical contact zones of the larger format.

It will in fact be understood that the global contact area 5 must allow the card 2 to communicate with a contact-based communication reader associated with the 2FF format, but also allow the card 3 (after detachment from the rest of the card 2) to communicate with a reader associated with the 3FF format, and allow the card 4 (after detachment from the rest of the card 3, even from the rest of the card 2) to communicate. For the contact surfaces of this global contact area 5 to be correctly centered on the theoretical contact zones of each of the formats, it is in fact logical for the cuts delimiting the cards 3 and 4 to be positioned so that the theoretical contact zones of the card 2 also constitute the theoretical zones of the cards defined by these cuts.

When the outlines of the cards 3 and 4 are compared for them to have the same theoretical contact zones as defined for the 3FF and 4FF formats, it is found that the top edge of the card 3 is situated at a distance of 0.330 mm from the top edge of the card 4.

This amounts to stating that the card 3 comprises, in addition to the card 4, a frame whose top side has a thickness of h=330 micrometers. Such a width does not a priori pose any problem for the detachment of the 4FF card from the 3FF card (still positioned, or not) within the card 2); however, it will be understood that, if there is a desire subsequently to convert the card 4 to the 3FF format by fitting into the abovementioned frame, the top side of this frame runs a great risk of being broken, such that the frame cannot constitute an effective adapter to convert this card 4 to the 3FF format.

Figure 2:
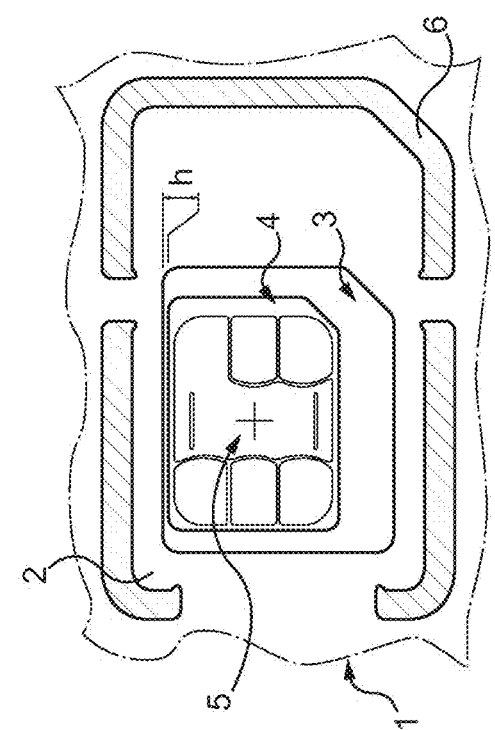
FIG. 2 is a plan view of a card in the 2FF format according to the invention, within a larger card, surrounding a cut in the 3FF format surrounding a cut in the 4FF format, according to the invention.

FIG. 2 represents a card 12 which, like the card 2, comprises a global contact area 15, surrounded by a cut delimiting a card 4, itself surrounded by a cut delimiting a card 13, itself surrounded by a cut delimiting a card 12. As previously, the card 14 is in the 4FF format, the card 13 is in the 3FF format and the card 12 is in the 2FF format; the cut delimiting the card is a slot 16 identical to the slot 6 of FIG. 1, within a card body 11.

The global contact area 15 is identical to the global contact area 5 of FIG. 1 and its individual contact surfaces are identical to those of this area 5. As illustrated in the figures, this area conforms to the standard format whose dimensions are 11 mm*8.32 mm; similarly, the cut delimiting the card 14 is arranged in the same way as the cut delimiting the card 4 within the card 4, around this global contact area 15, and the slot 16 has the same location relative to the global contact area 15 as the slot 6 relative to the global contact area 5.

However, the cut delimiting the card 3 is offset upward, by a distance d relative to the cut of the card 3 around the global contact area 15. It results therefrom that the card 13 comprises, complementing the card 14, a frame whose top side has a width of (h+d) and therefore is has a better mechanical strength than the top side that the card 3 comprises complementing the card 4.

Figure 3:
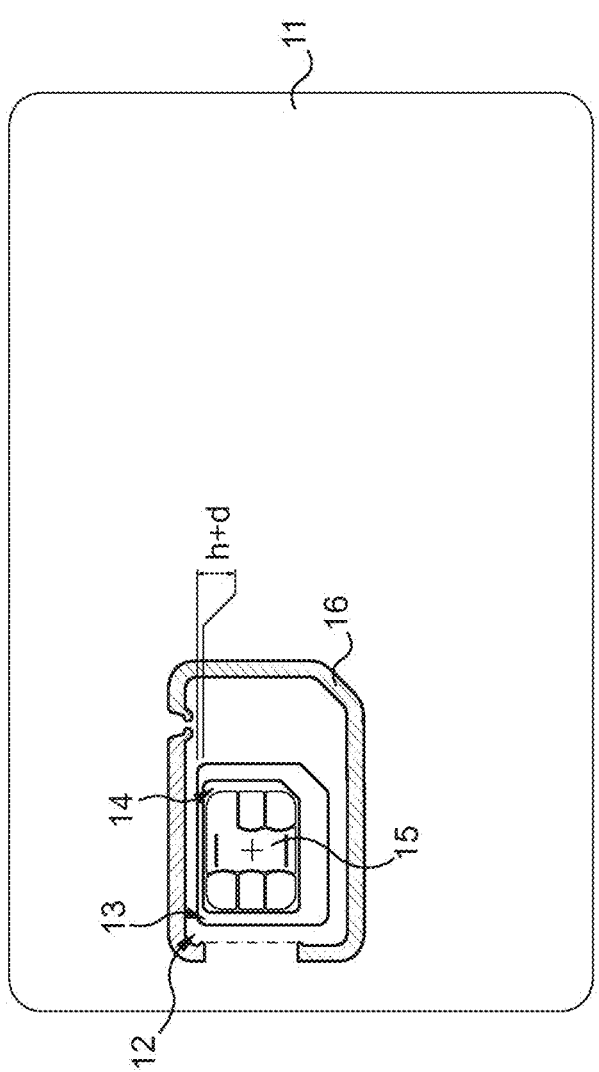
FIG. 3 is a plan view of the card of FIG. 2 within a card in the 1FF format.

FIG. 3 represents all of the card body 11 within which all of the cards 12 to 14 of FIG. 2 are situated. Advantageously, in addition to this set of cards 12 to 14, this card body 11 forms a card conforming to the 1FF format whose theoretical contact zones are merged with the theoretical contact zones of cards 12 and 14.

The upward offset of the outline of the card 13 relative to the outline of the card 3 is chosen such that the theoretical contact zones defined by the standards relative to this outline of the card 13 are entirely encompassed in the contact surfaces of the global contact area 15 that the card 14 comprises.

It has emerged that, given the current level of the tolerances associated with the various steps in fabricating such a card 12 with a number of formats, it would be possible to significantly enlarge the width of the top side that the card 13 comprises complementing the card 14.

Figure 4:
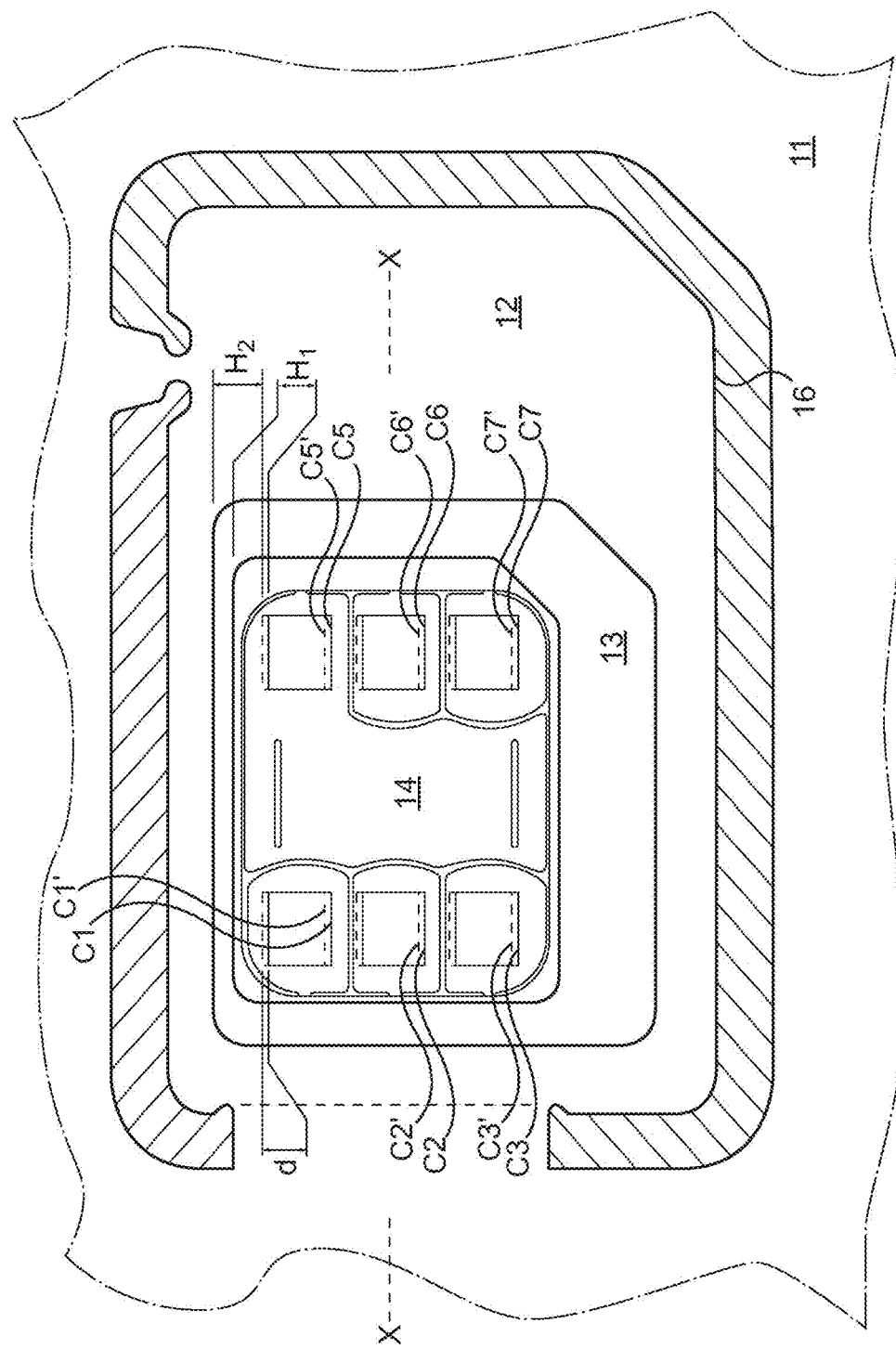
FIG. 4 is a view of the card of FIG. 2 showing the theoretical contact zones through the contact surfaces.

That emerges from the examination of FIG. 4 which shows the cards 12 to 14, as well as the theoretical contact zones of the cards 12 and 14; these contacts are conventionally designated by C1 to C3, C5 to C7, it being recalled that the standards provide two other contact zones C4 and C8 which can, by choice, be in the extension of the columns formed by the zones C1 to C3, on the one hand, and the zones C5 to C7 on the other hand, or be situated between these columns. Since these zones C4 and C8 are often not of use, they are not represented here and no individual contact surface is associated therewith; it will however be understood that, in an application in which these zones C4 and C8 were to be of use, it would be sufficient to modify the area C5 so that it is not prolonged to the left relative to the contacts C6 and C7, and the contact surface situated between the columns could be modified so as to be broken down into two individual contact surfaces respectively covering the theoretical zones associated with the contacts C4 and C8.

It can be noted that the individual contact surfaces C1 to C3, on the one hand, and C5 to C7, on the other hand, define, within the global contact area (and therefore within the card), two parallel columns situated in proximity to two edges of this global contact area.

The reason for which one of the contact surfaces, here that associated with the contact C5, is prolonged to occupy the space not occupied by the other contact surfaces allows the set of contact surfaces to occupy almost all of the surface area of the global contact area 5. As a variant, notably for customization purposes it is however possible to provide for leaving, within this global area, spaces not covered by such contact surfaces.

The abovementioned theoretical contact zones are represented by rectangles in solid lines.

According to the geometry currently chosen for the global contact areas, the contact surfaces C1 and C5 are, within the abovementioned columns, symmetrical to the contact surfaces C3 and C7 relative to a median line of the global contact area 15, schematically represented by the line X-X, and the surfaces C2 and C6 are symmetrical relative to this line; it will be understood that this median line is such that the top and bottom edges of the contact area, usually parallel to the edges of the cards, are at a same distance from this median line; in practice, this line is at least approximately merged with a median line of the card body of the card 14 (disregarding the cut corner at the bottom right); that amounts to stating that the top edge of the global contact area is at a distance from the top edge of the card 14 which is equal to the distance between the bottom edges of this area and of this card. The vertical dimension of the surfaces C1, C3, C5 and C7 is here greater than the vertical dimension of these median surfaces C2 and C6. The interstices between these surfaces, usually identical between any pair of adjacent surfaces, are preferably centered on the interstices between the theoretical contact zones of the card 14 in the 4FF format.

It will be understood that the fact that one or the other of the individual surfaces can be connected, or not, to a central zone remains compatible with the abovementioned notion of symmetry.

Because of the upward offset d of the outline of the card 13 (with reference to the card 14) relative to the outline of the card 3 (with reference to the card 4. The theoretical contact zones defined by the standards for the 3FF format of this card 13 have, relative to the theoretical zones associated with the cards 12 and 14, a same offset d. These theoretical zones, denoted C1', C2', C3', C5', C6' and C7', are represented by rectangles in broken lines, which are distinguished from the rectangles in solid lines only by their top and bottom sides.

Unlike the theoretical zones of the cards 12 and 14 which are centered relative to the contact surfaces materialized in the global contact area 15, these theoretical zones C1'-C3' and C5'-C7' are off-center relative to these contact surfaces; however, they remain contained within the outline of these contact surfaces, which guarantees that the 3FF card can communicate reliably with a contact-based communication device associated with the 3FF format.

The amplitude of the offset applied to the outline of the card 13, and therefore to the associated theoretical zones relative to those of the cards 12 and 14, is less than or equal to a maximum threshold corresponding to a configuration in which the top edge of one of these theoretical zones is superimposed, to within the fabrication tolerances, on the top edge of the contact surface which covers it.

If e is used to denote the width of the interstice between the contact surfaces, (for which it has been indicated that it is usually identical between all the contact surfaces parallel to the columns C1-C3 and C5-C7), and E is used to denote the width of the interstice between the theoretical contact zones associated with the 3FF format, and if T denotes the aggregate value of the tolerances associated with the various operations involved in the fabrication of a card such as that of FIG. 2 (notably in the case of a large card 11 in the 1FF format), it can be concluded, if the interstices between the contact surfaces are centered on the interstices between the theoretical contact zones of the 4FF format, that the offset can range up to a value dmax equal to $$D\max=(E-e)/2-T$$

In a usual configuration, the interstice between the contact surfaces is 150 micrometers such that, the interstice between theoretical contact zones being 840 micrometers, each contact surface extends beyond the associated theoretical zone by (E−e)/2=345 micrometers.

If the tolerance concerning the etching of the contact material (in practice, copper) is assessed at approximately 50 micrometers, the tolerance of the machining of the slot, the tolerance of the cutting of the module (that is to say all of the contact area and of the associated microcircuit) and the tolerance in the inserting of this module into the card, as well as the cutting tolerance for the outline of the card 13 (preferably by punching), the result is an overall tolerance of 0.183 micrometers, obtained by computation methods known to those skilled in the art for establishing the aggregate tolerances.

By deducting this tolerance from the amplitude of the abovementioned overflow, a value dmax of 162 micrometers is obtained. It will be understood that, by choosing an offset with this maximum value, the width of the top side of the frame that the card 13 includes complementing the card 14 is increased from 330 micrometers to 492 micrometers, which corresponds to a very substantial increase in this width (close to 50%).

In practice, it can be estimated that the mechanical strength of the top side, given the usual material from which the card bodies are made, become satisfactory when the width is at least 400 micrometers.

It can be noted that the top side concerned is delimited by two cutting operations (preferably by punching), for which the tolerance can be assessed at 50 micrometers, hence an aggregate tolerance of 70 micrometers (in practice, an aggregate tolerance is defined as being the product of the sum of the tolerances by half the square root of 2). That amounts to stating that this minimum value empirically chosen at 400 micrometers corresponds effectively to a widening of the top side even by taking into account the tolerances.

Obviously, it is advantageous for the top side to have an even greater width, for example at least equal to 450 micrometers, even 500 micrometers.

It will be understood that the maximum value of the offset of the outline of the 3FF card depends on the width that is chosen for the interstice between the contact surfaces; in fact, the smaller this width becomes, the more the contact surfaces overflow relative to the theoretical contact zones.

By way of example, if, for these interstices, a width of scarcely 50 micrometers is chosen, there is obtained, with the same assessment of the tolerances, a maximum offset value of 212 micrometers, which amounts to allowing the top side to have a width of 542 micrometers. Preferably, this width has a maximum value of 550 micrometers or even of 545 micrometers.

The invention is generalized to the case where, contrary to the configuration in which, without abandoning the rules of symmetry of the contacts C1 to C3 and C5 to C7 relative to a median line of the global contact area, there is a desire to offset the interstices between these contact surfaces relative to the interstices between the theoretical zones. In such a case, the maximum value of the offset is defined by Δe−T, in which Δe is the minimum distance that exists between an edge of an individual contact surface and an edge of the theoretical contact zone; thus, for example, for a same assessment of the tolerances as previously, it is possible to retain a top side of at least 400 micrometers with an offset of 45 micrometers.

By way of example, in a card such as that of FIG. 3, the top edge of the outline of the card 13 is situated at 17.73 micrometers from the top edge of the complete card in the 1FF format, whereas the card 12 and the card 14 have top edges which are, respectively, at 16.48 mm and 18.22 mm from this top edge of the complete card.

It is worth noting that, when it is indicated that the contact surfaces of the global contact area are symmetrical relative to a median line of this area, this symmetry must be interpreted to within the fabrication tolerances; similarly, when it is indicated that the interstices between the individual contact surfaces have equal or that they are centered on the interstices, this notion of centering or of equality must be interpreted to within the fabrication tolerances; in practice, the aggregate tolerances for these expressions are less than or equal to around a hundred or so microns.

The invention claimed is:

1. A microcircuit card comprising:
a global contact area comprising a plurality of individual contact surfaces C1 to C3, C5 to C7 connected to the microcircuit card by defining two parallel columns situated in proximity to two edges of the global contact area, the global contact area being in a card body having a format at least equal to the 2FF format, the card body having a pre-cut formed therein in the 4FF format surrounding the global contact area and having a pre-cut formed therein in the 3FF format surrounding the pre-cut in the 4FF format, the pre-cuts being such that the individual contact surfaces C1 to C3, C5 to C7 have, relative to each of the pre-cuts, positions and dimensions such that the individual contact surfaces encompass the theoretical contact zones defined by the standards defining the 4FF, 3FF, and 2FF formats, the top edge of the pre-cut in the 3FF format, defined by the longitudinal edge of the pre-cut furthest away from the corner of the pre-cut in the 3FF format comprising a feature-forming sloping edge, being situated at a distance at least equal to 400 micrometers and less than or equal to 542 micrometers from the top edge of the pre-cut in the 4FF format, the individual surfaces C1 and C5 being, within the columns, symmetrical to the individual surfaces C3 and C7 relative to a median line of the global contact area extending parallel to the length of the global contact area, wherein the theoretical contact zones of the pre-cut in the 3FF format are offset toward the top edge of the card, relative to the theoretical contact zones of the pre-cut in the 4FF format, by a value less than or equal to (E−e)/2−T, when E is the width of interstices between the theoretical contact zones, e is the width of the interstices between the individual contact surfaces, and T is a fabrication tolerance value.

2. The microcircuit card as claimed in claim 1, wherein the card body in the 2FF format is delimited, by a discontinuous slot, within a card in the 1FF format, the theoretical zones of which are merged with the theoretical zones of the card in the 2FF format.

3. The microcircuit card as claimed in claim 1, wherein the global contact area is formed by contact surfaces separated by interstices centered on the interstices between the theoretical contact zones of the card in the 4FF format.

4. The microcircuit card as claimed in claim 1, wherein the distance between the top edge of the pre-cut in the 3FF format and the top edge of the pre-cut in the 4FF format is at least equal to 490 micrometers.

5. The microcircuit card as claimed in claim 1, wherein the distance between the top edge of the global contact area and the top edge of the pre-cut in the 4FF format is equal to the distance between the bottom edge of the global contact area and the bottom edge of the pre-cut in the 4FF format.

6. The microcircuit card as claimed in claim 5, wherein the contact area has a standardized format delimited by a rectangular form whose dimensions are equal to 11*8.32 mm.

7. The microcircuit card as claimed in claim 2, wherein the global contact area is formed by contact surfaces separated by interstices centered on the interstices between the theoretical contact zones of the card in the 4FF format.

8. The microcircuit card as claimed in claim 7, wherein the theoretical contact zones of the pre-cut in the 3FF format are offset toward the top edge of the card, relative to the theoretical contact zones of the pre-cut in the 4FF format, by a value less than or equal to (E−e)/2−T, when E is the width of the interstices between the theoretical contact zones, e is the width of the interstices between the individual contact surfaces, and T is a fabrication tolerance value.

9. The microcircuit card as claimed in claim 2, wherein the distance between the top edge of the pre-cut in the 3FF format and the top edge of the pre-cut in the 4FF format is at least equal to 490 micrometers.

10. The microcircuit card as claimed in claim 3, wherein the distance between the top edge of the pre-cut in the 3FF format and the top edge of the pre-cut in the 4FF format is at least equal to 490 micrometers.

11. The microcircuit card as claimed in claim 2, wherein the distance between the top edge of the global contact area and the top edge of the pre-cut in the 4FF format is equal to the distance between the bottom edge of the global contact area and the bottom edge of the pre-cut in the 4FF format.

12. The microcircuit card as claimed in claim 3, wherein the distance between the top edge of the global contact area and the top edge of the pre-cut in the 4FF format is equal to the distance between the bottom edge of the global contact area and the bottom edge of the pre-cut in the 4FF format.

13. The microcircuit card as claimed in claim 4, wherein the distance between the top edge of the global contact area and the top edge of the pre-cut in the 4FF format is equal to the distance between the bottom edge of the global contact area and the bottom edge of the pre-cut in the 4FF format.

* * * * *